Oct. 12, 1954  C. L. WECKESSER  2,691,259
METHOD AND APPARATUS FOR PACKAGING MATERIALS
Original Filed Nov. 13, 1946  7 Sheets-Sheet 1
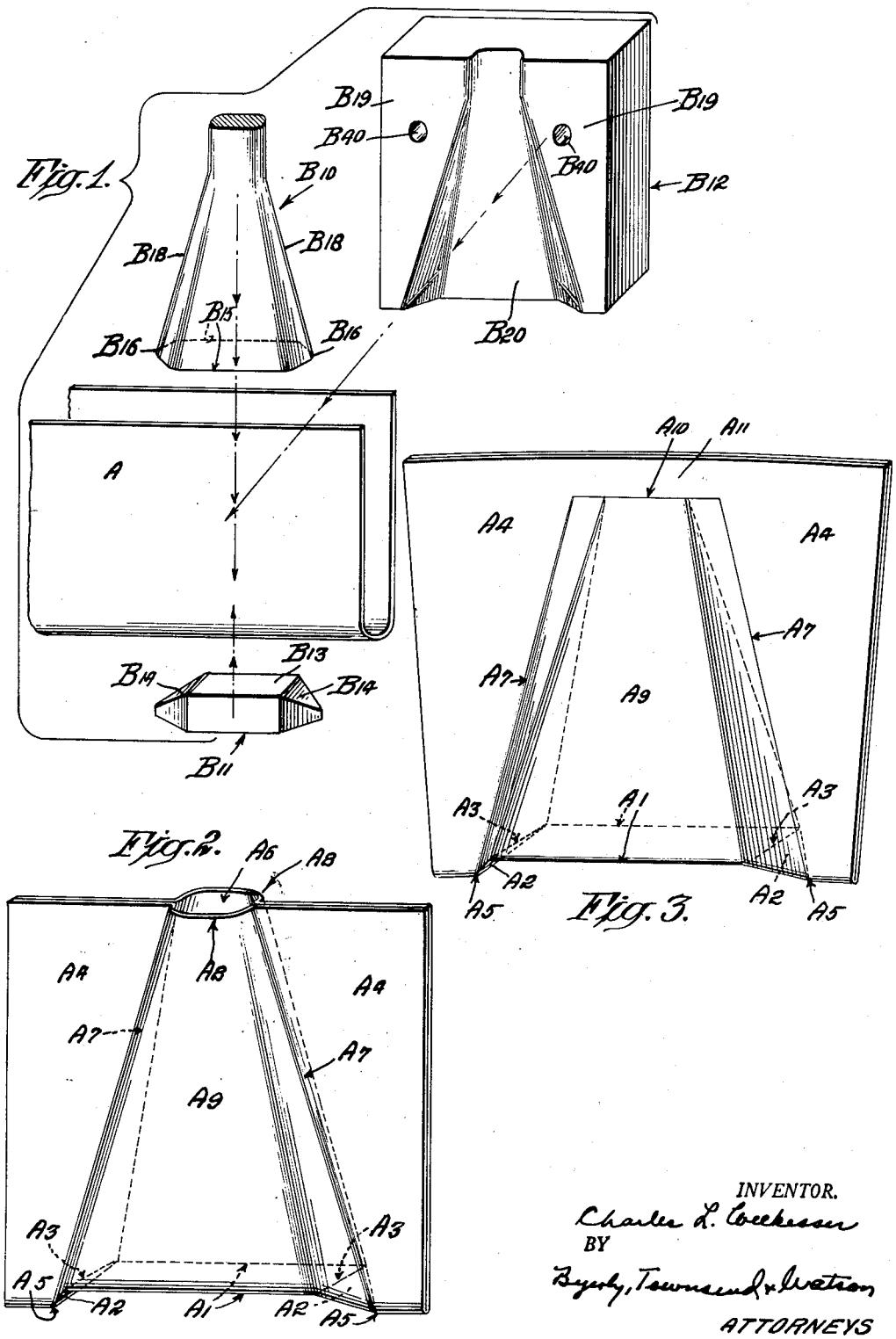
INVENTOR.
Charles L. Weckesser
BY
Byerly, Townsend & Watson
ATTORNEYS

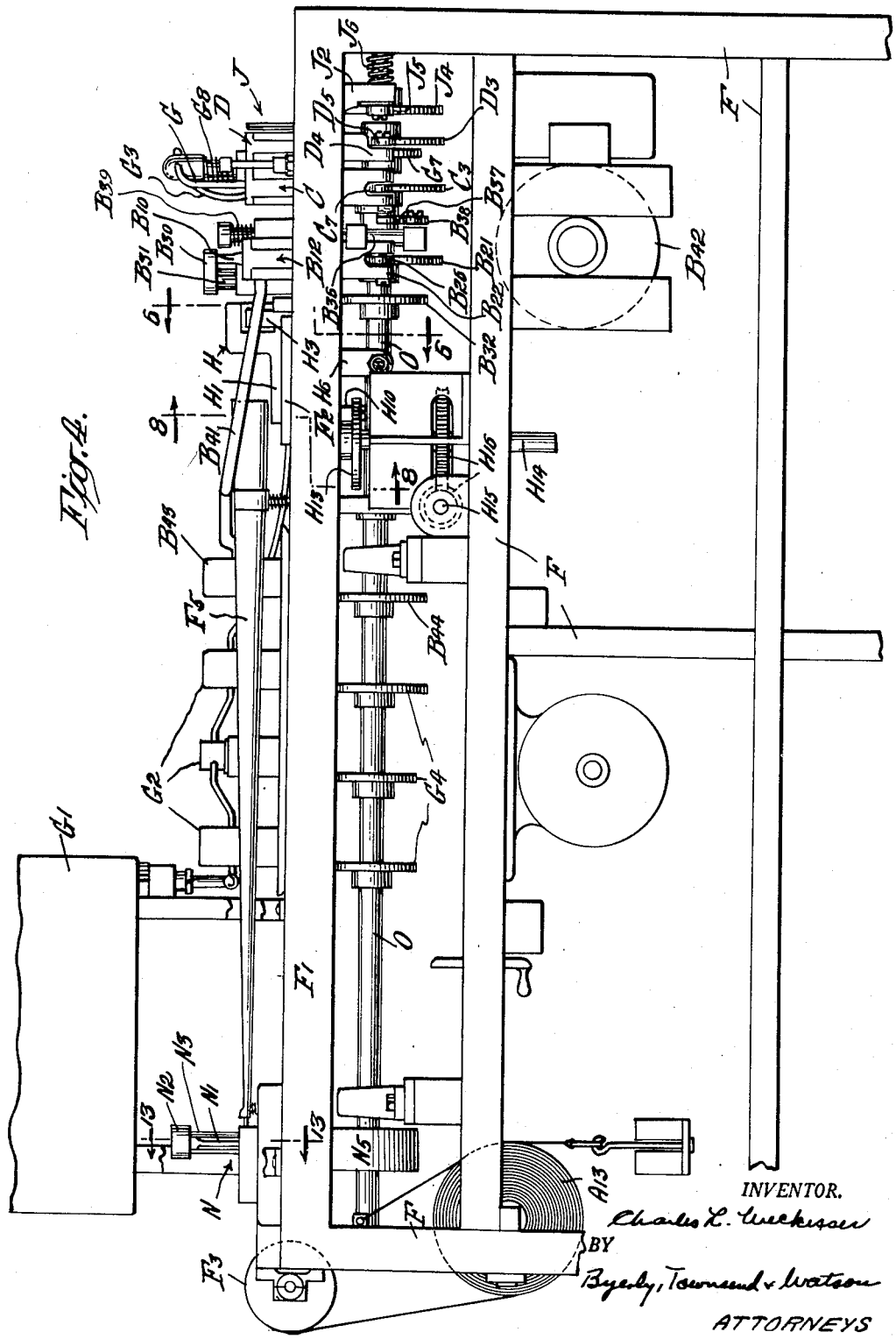

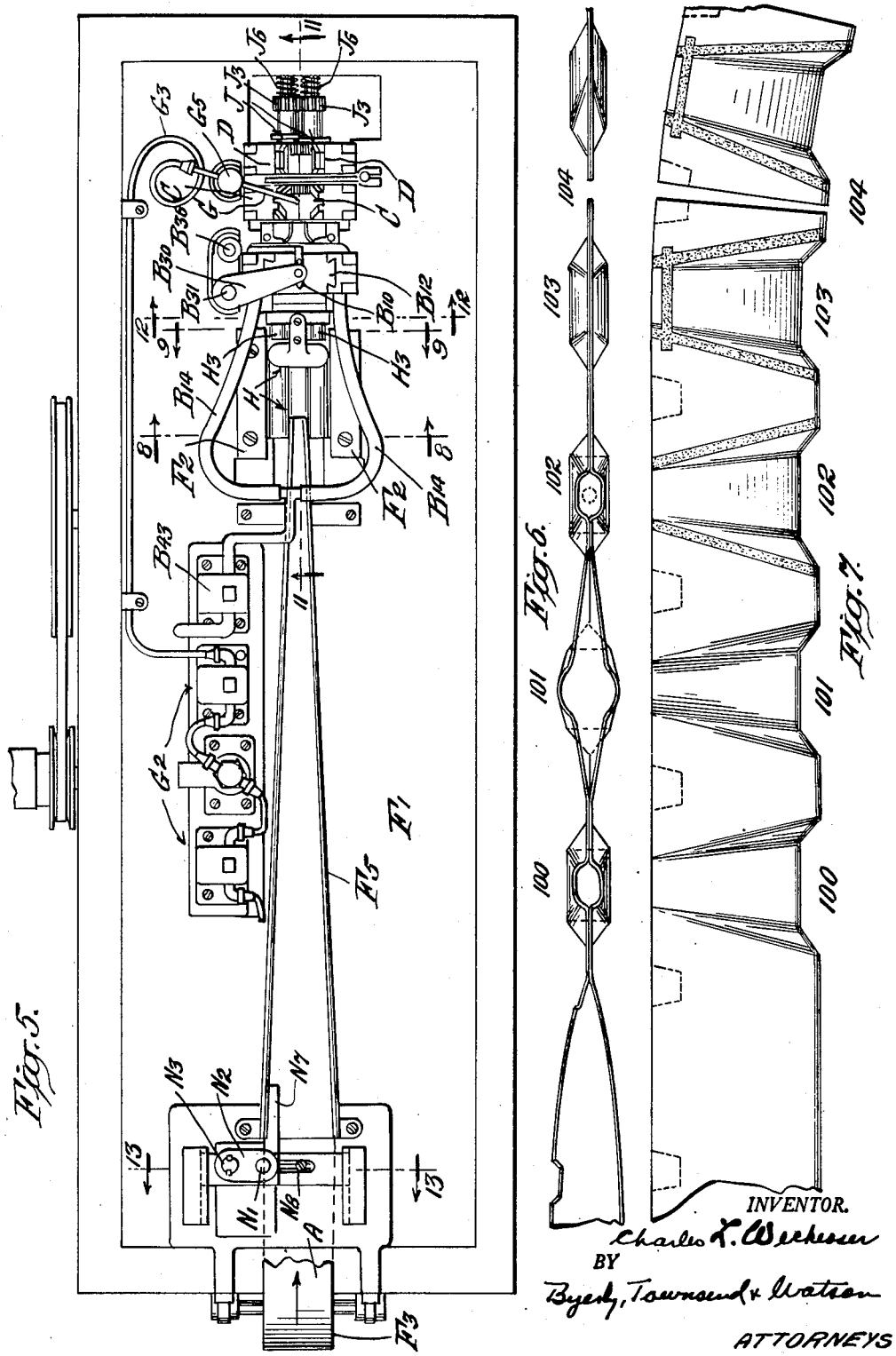

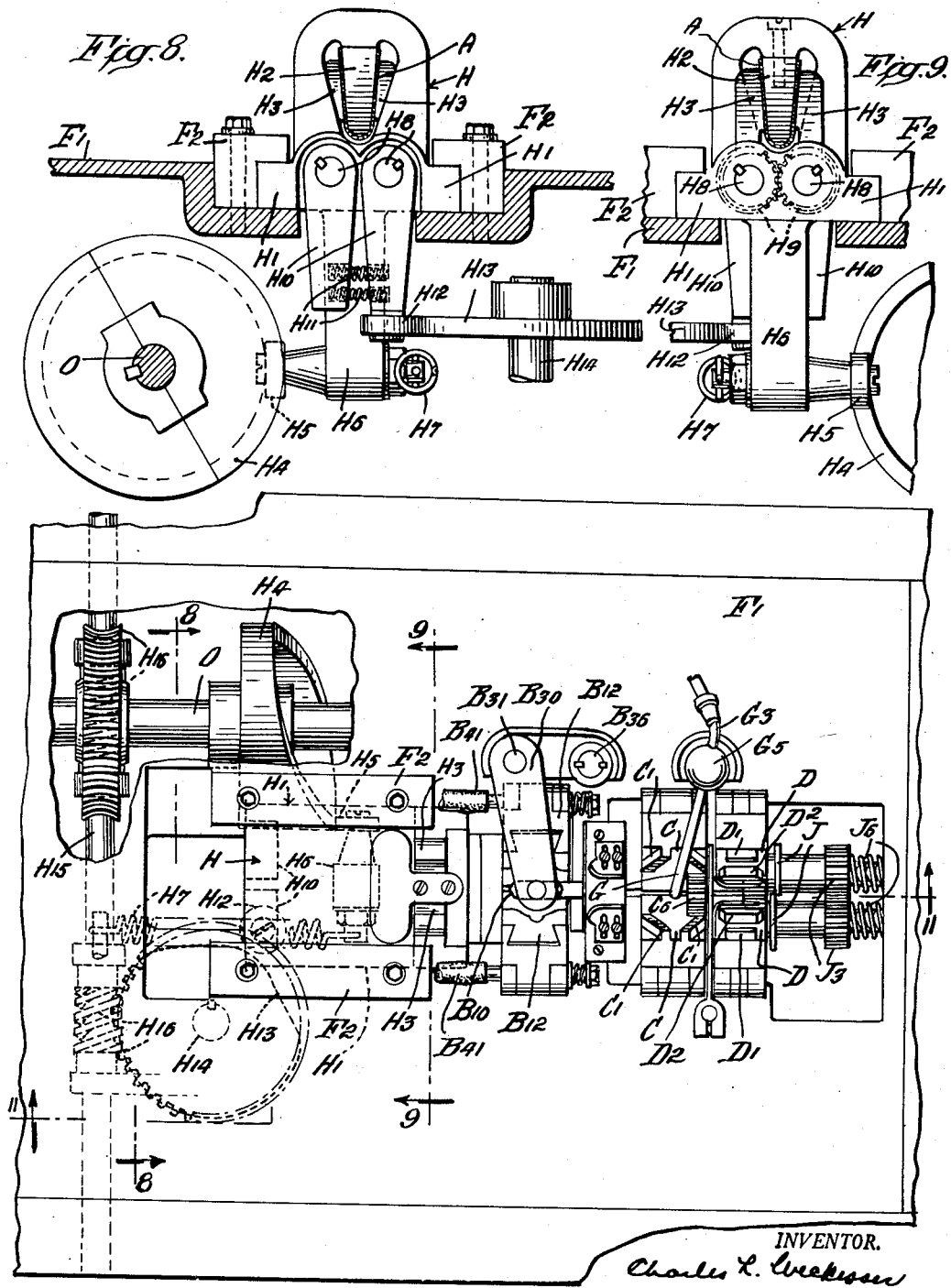

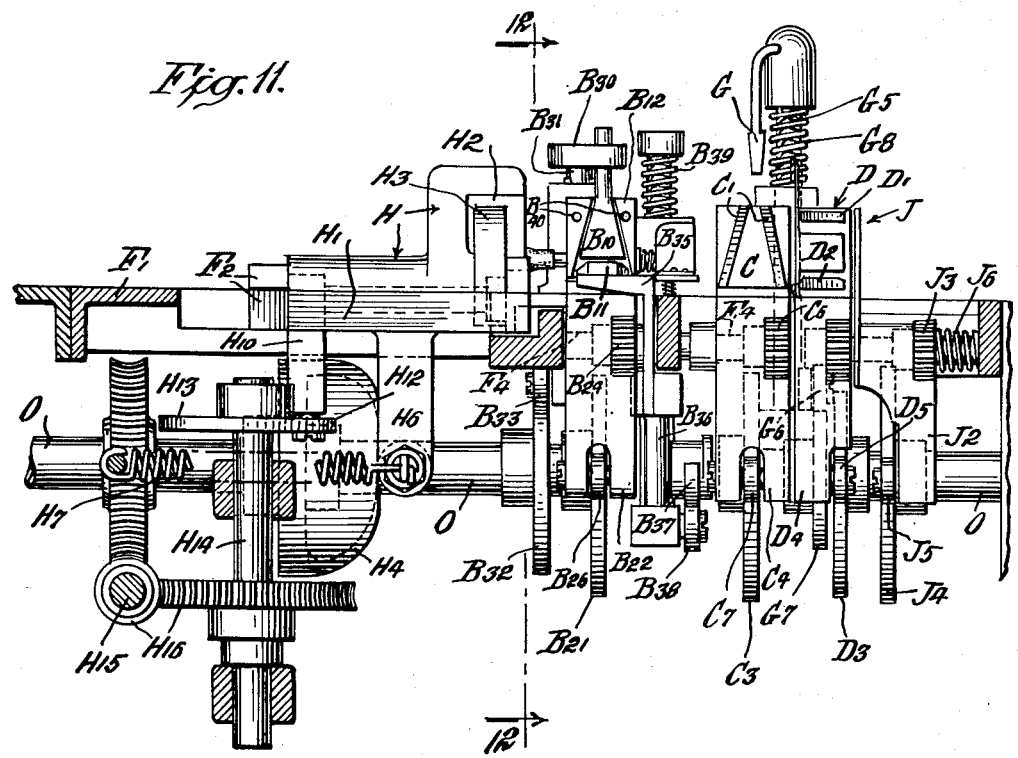
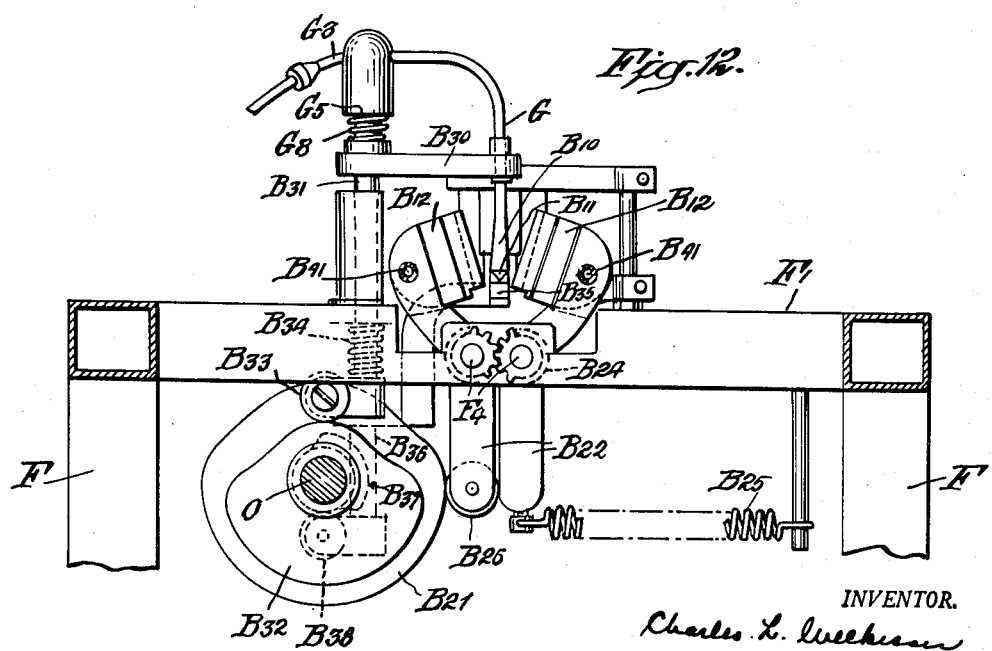

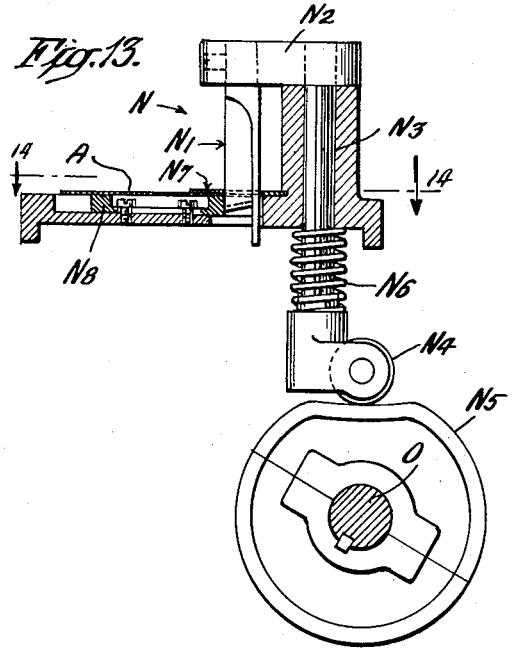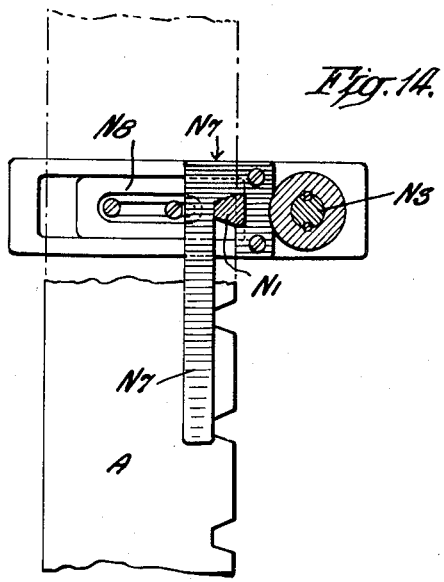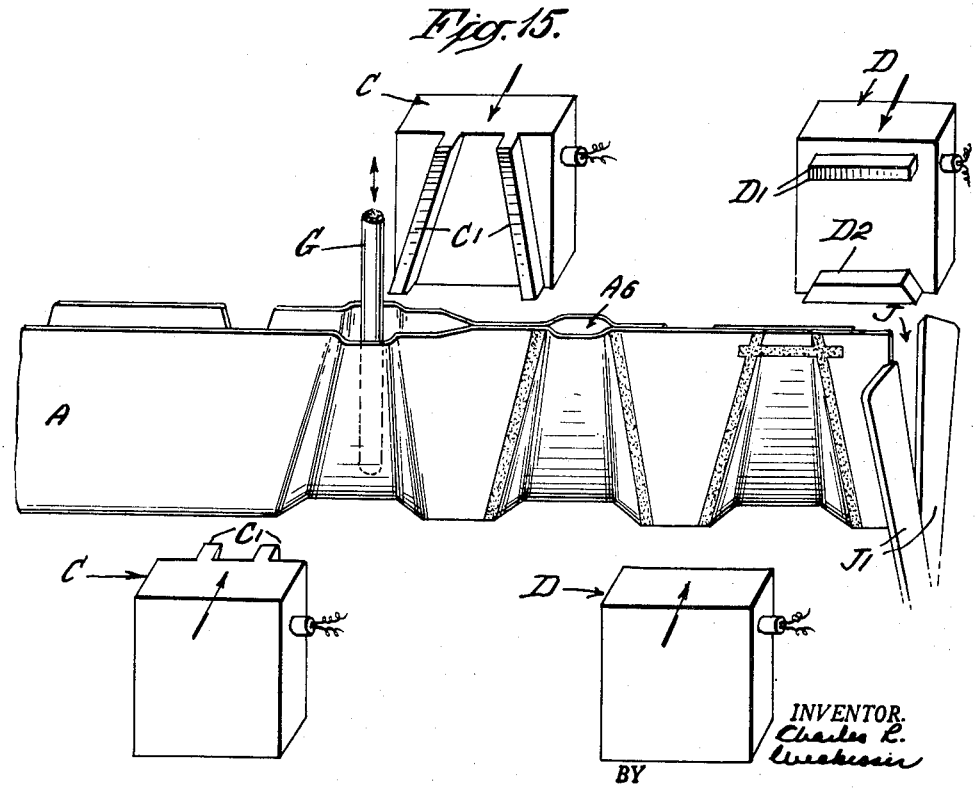

Oct. 12, 1954  C. L. WECKESSER  2,691,259
METHOD AND APPARATUS FOR PACKAGING MATERIALS
Original Filed Nov. 13, 1946  7 Sheets-Sheet 7
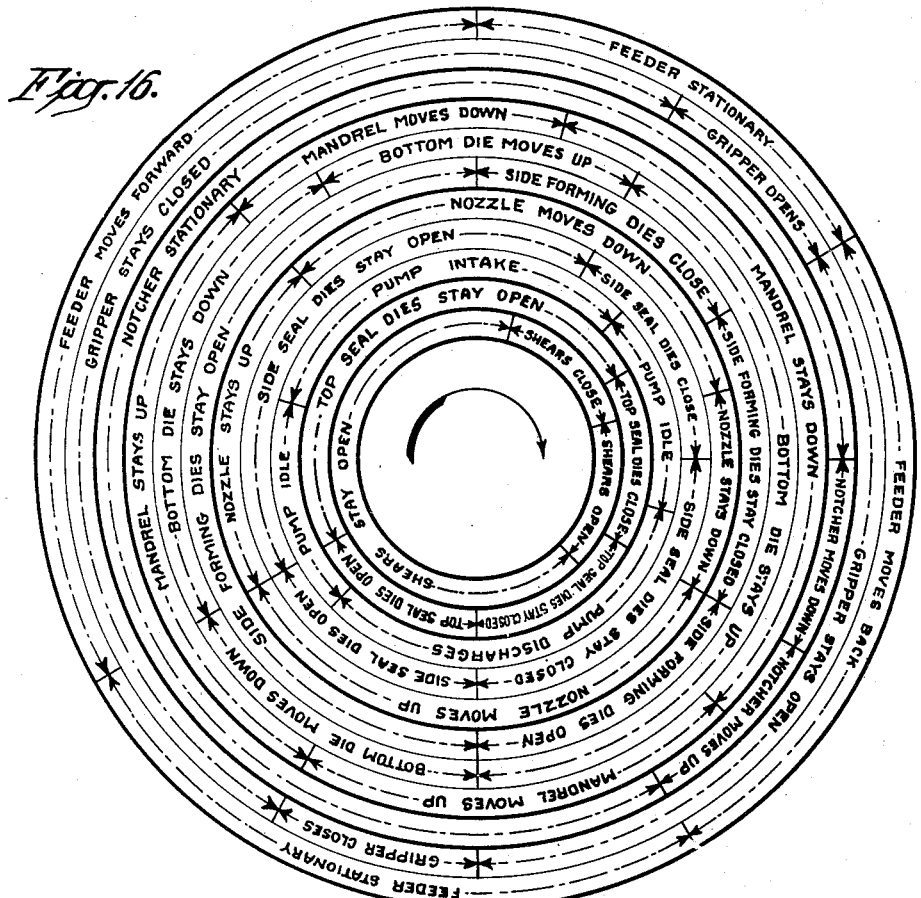
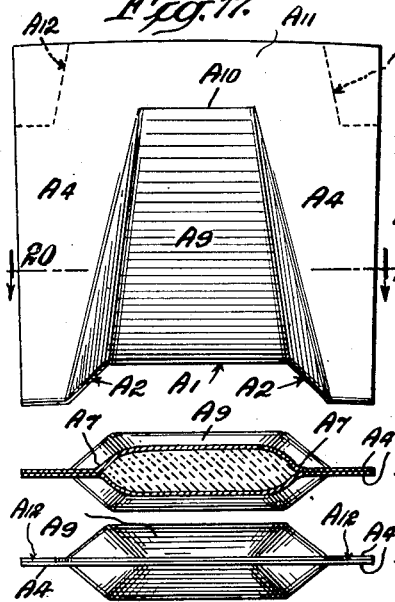
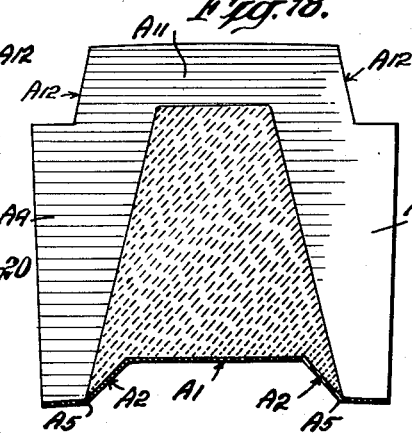
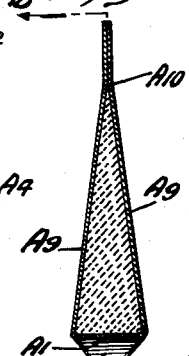
INVENTOR.
Charles L. Weckesser
BY
Byerly, Townsend & Watson
ATTORNEYS Patented Oct. 12, 1954

2,691,259

UNITED STATES PATENT OFFICE 2,691,259

METHOD AND APPARATUS FOR PACKAGING MATERIALS

Charles L. Weckesser, Los Angeles, Calif., assignor, by mesne assignments, to Norwich Pharmacal Company, Norwich, N. Y., a corporation of New York Original application November 13, 1946, Serial No. 709,627. Divided and this application December 9, 1947, Serial No. 790,699

18 Claims. (Cl. 53—9)

This invention relates to packaging and aims to provide a new method and apparatus for packaging materials. A particular object of my invention is to provide a new method and machine which may be used for producing a new wrapped molded article for medicinal use such as the product claimed in my application Serial No. 709,627, filed November 13, 1946, now U. S. Patent No. 2,634,857 of which this application is a division.

Suppositories are ordinarily molded of wax-like material which has a melting point at or near body temperature. They have a particular tapered form which is essential for their intended use. In the past, it has been impossible to keep suppositories in warm weather without refrigeration, for, regardless of how they may be wrapped, they soften or melt and, even if they do not leak from the wrapper, they lose their intended form and thereby become useless.

My invention overcomes this difficulty and provides an article having many advantages. In accordance with my invention, a sheet of metal foil or the like is used both as a mold for forming a suppository and as a wrapper for the suppository which has been molded in it. The opening in the mold for introduction of the material to be molded is hermetically sealed after the material has been introduced. The metal foil acts, not only as a sealed wrapper completely protecting the molded article, but also as a continuously available mold which retains the wax-like material in the proper tapered form, even if the material is softened or melted. The new wrapped suppository is, therefore, not injured by subjecting it to temperatures above the melting point of the suppository mass.

The foil which constitutes both the mold and the wrapper is die-formed, without stretching or wrinkling of the sheet of foil. It is given the shape of a wide-bottomed pocket whose top may be opened or closed without changing the shape of its bottom. The form of the pocket is such that when the pocket is closed at the top it has the tapered shape required for a suppository.

The method which I have invented for making the article involves the steps of die-forming a sheet of foil into an open pocket, gripping and sealing the side edges of the pocket and simultaneously filling the pocket with liquid or soft material to be molded, and closing and sealing the top of the pocket before the material has hardened.

The machine which I have invented for making the new article is rapid and automatic in operation and has the advantage of producing in quantity sealed suppositories each containing exactly the same amount of suppository material and, therefore, the same amount of any medicament contained in the material.

In order that my invention may be clearly understood, I will describe in detail a particular wrapped suppository embodying my invention, and a method and machine for making it which also embody the invention. In this description, I shall refer to the accompanying drawings in which:

Fig. 1 is a diagrammatic perspective view illustrating means for performing the step of die-forming sheet material into a mold;

Fig. 2 is a perspective view of sheet material formed into a mold or pocket by the instrumentalities illustrated in Fig. 1;

Fig. 3 is a perspective view showing the form taken by the sheet material when the mold or pocket of Fig. 2 is closed;

Fig. 4 is a side view of an automatic machine for making wrapped suppositories;

Fig. 5 is a top view of the machine;

Figs. 6 and 7 are top and side views of a strip of foil passing through the machine;

Fig. 8 is an enlarged transverse section of the machine on the lines 8—8 of Figs. 4, 5 and 10, showing the gripper for moving the foil;

Fig. 9 is a similar section looking in the opposite direction and taken on the lines 9—9 of Figs. 4, 5 and 10;

Fig. 10 is an enlarged partial top view of the right-hand part of the machine with part of the table broken away;

Fig. 11 is an enlarged longitudinal vertical section on the lines 11—11 of Fig. 5 and Fig. 10;

Fig. 12 is a transverse section on the lines 12—12 of Figs. 4, 5 and 11;

Fig. 13 is a transverse section on the lines 13—13 of Figs. 4 and 5 showing the notcher;

Fig. 14 is a horizontal section of the notcher on the line 14—14 of Fig. 13;

Fig. 15 is a perspective diagrammatic view of parts operating on the foil;

Fig. 16 is a timing diagram of the machine; and

Figs. 17–21 show the wrapped suppository; Fig. 17 being a side view; Fig. 18 an axial section on the center lines of Figs. 19, 20 and 21; Fig. 19 a transverse section on the center lines of Figs. 17 and 18; Fig. 20 a horizontal section on the line 20—20 of Fig. 17; and Fig. 21 a top view.

I will first describe a method of making a wrapped suppository in accordance with my invention. The materials used in the method are a sheet of metal foil coated on one side with a thermoplastic adhesive capable of sealing in the presence of grease, and a supply of molten material such as medicated wax.

The first step in the method consists of die-forming a sheet A of metal foil into a pocket having a wide and quite rigid bottom and an open mouth. This step is illustrated in Fig. 1 which shows in perspective the sheet A of foil in the form of a U-shaped trough and a mandrel B10, a bottom die B11 and one of two side dies B12 which are moved against the U-shaped sheet of foil. The bottom die B11 has an upper or molding surface whose central part B13 is flat and rectangular and whose end parts B14 are triangular and are inclined downwardly from the central part B13. The inner die or mandrel B10 has a flat bottom B15 with curved ends B16. The bottom B15 of the mandrel is longer than the flat middle part B13 of the bottom die so that when they are brought together it projects over the inclined end portions B14 of the bottom die B11. The mandrel B10 is of substantially uniform thickness and has curved side edges B18 which taper inwardly toward its top. Each side die B12 has a flat original contact surface B19 and a central recess B20 which is formed to fit around the curved side edges B18 of the mandrel B10 and around the inclined end portions B14 of the bottom die B11.

In the die-forming operation, the mandrel B10 is brought down inside the U-shaped piece of foil and the bottom die B11 is brought up against the bottom of the U-shaped piece of foil so that a portion of the bottom of the U is flattened between the flat surfaces B15, B13 of the mandrel and bottom die. The side dies B12 are then brought together so that they draw the foil around the sides of the mandrel B10 and force the foil against the end portions B14 of the bottom die B11 to form the pocket shown in Fig. 2. The pocket has a bottom having a flat central portion A1 and two downwardly-inclined pointed end portions A2. This bottom is formed without stretching or creasing the foil and has considerable rigidity owing to its transverse crease lines or angles A3. The side walls A9 of the pocket extend upward nearly parallel from the side edges of the middle portion A1 of the bottom to the sides of the open top A6. The end walls of the pocket extend upward from the converging edges of the end portions A2 of the bottom and each end wall consists in effect of two parts hinged together at one of the edges A7 of the pocket. The portion of the foil lying outside the boundary of the pocket is formed by the flat margins B19 of the side dies B12 into double or folded flanges A4 which extend along the side edges A7 of the pocket from the apices A5 of the inclined ends A2 of the bottom of the pocket to the top edges of the folded sheet A.

The forming of the bottom of the pocket shortens the length of the bottom of the trough of foil, while the forming of the open mouth A6 of the pocket shortens the upper edge of the trough to the same extent.

The next step is to withdraw the forming dies B10, B11, B12. The withdrawal of the mandrel B10 is not difficult as the flanges A4 may be separated at the top to permit removal of the mandrel without deforming the bottom A1, A2 of the pocket.

The next step consists in sealing the side edges of the pocket. This is accomplished by a pair of sealing dies C (Fig. 15) having heated faces C1 corresponding to at least part of the contact faces B19 of the side-forming dies B12 so that, when they are brought against the folded foil from opposite sides after the removal of the forming dies B10, B11, B12, they force together the flanges A4 at the sides of the pocket, restoring the pocket to the form which it was given by the forming dies B10, B11, B12, and which is shown in Fig. 2. The heat from the sealing dies C seals together the inner part of the side flanges A4 of the pocket by means of the thermoplastic adhesive with which the inner surface of the foil is coated.

The next step consists in pouring into the pocket through its open upper end A6 a measured quantity of the melted wax from which the suppository is to be formed. This step is most desirably performed while the side flanges A4 of the pocket are grasped by the side sealing dies C and may take place simultaneously with the sealing of the side flanges A4.

The next step consists in changing the form of the pocket while the wax is still molten or at least soft, so as to give it the tapered shape required in a suppository. This requires spreading apart the side edges A7 of the pocket at the upper part of the pocket so as to bring the upper edges A8 of the pocket together in a line and make the sides A9 of the pocket incline towards each other from the bottom to the top of the pocket, as shown in Fig. 3.

This step is accomplished by releasing the side flanges A4 of the pocket so that they may be spread apart, and then pressing two dies D (Fig. 15) with projecting engaging surfaces D1 together near the top A6 of the pocket to close the pocket and incline the side walls A9 of the pocket inwardly so that they come together at a line A10 near the top of the folded foil (see Fig. 3). The dies D which perform this function also have projections D2 extending under the bottom of the pocket to align the dies.

This closing of the top of the pocket and giving it a tapered form is most desirably carried out simultaneously with sealing the top of the pocket. For this purpose, the projecting contact portions D1 of the dies D are heated so that they seal the plastic inner coating of the foil along the line A10 across the top of the pocket.

The result is a wrapped suppository of the form shown in Fig. 3 and Figs. 17–21 in which a tapered molded mass is completely sealed in a wrapping of metal foil. The bottom of the wrapped suppository has the flat central portion A1 and the downwardly-inclined pointed end portions A2 which has been previously described. The sides and top of the suppository are completely surrounded by an extending flange consisting of the side flanges A4 and a top flange A11 formed by the closing and sealing of the top of the pocket. The flange consists of two layers of metal foil sealed together around the sides and top of the suppository so that the flange and the metal foil across the bottom of the suppository completely enclose and protect the molded material. The die-formed foil keeps the molded material in the desired shape even if it becomes melted.

The presence of the flanges A4, A11 provides a convenient means for removing the wrapper when the molded suppository is to be used. The flange may easily be torn from the molded material, or, since the two layers of foil are sealed together only along the inner part of the flange, the two layers may be separated at the outer part of the flange and torn apart. To facilitate the latter operation, it is desirable, but not necessary, to provide notches A12 in the corners of one of the layers forming the flange. These notches may be cut in the sheet of foil before the foil is formed into a mold.

The wrapped suppository which has been described may be made by carrying out the described method manually by means of separate instrumentalities. An important feature of my invention, however, consists in providing an automatic machine for carrying out the successive steps of the method in proper timed relation.

The machine shown in the drawings has a frame F providing a table top F1 (Figs. 4 and 5). Above the table is mounted a tank G1 which provides a supply of molten medicated wax. The tank may be provided with suitable stirring and heating devices (not shown). The liquid is dispensed from the tank by means of a measuring pump G2 of ordinary construction.

A roll A13 of metal foil coated with thermoplastic adhesive is supported on the frame F below the front end of the table. The web of foil A is drawn over a pulley F3 through a notcher N and along the top of the table in a trough-like guide F5. The web of foil is drawn forward intermittently and formed into a U-shaped trough by a foil feeder H. It is then acted on by forming dies B10, B11, B12, side sealing dies C, top sealing dies D, and is finally cut off by shears J.

A power-driven cam shaft O carries cams for operating and properly timing the foil feeder and the instrumentalities which act on the foil.

The foil feeder H is best shown in Figs. 8, 9 and 10. It consists of a slide H1 moving in guides F2 fixed to the table F1. The slide H1 has an upstanding portion carrying a depending U-shaped mandrel H2 (Figs. 8 and 9) around which the web of foil A is folded. It also has a pair of gripper arms H3 for clamping the foil against the mandrel H2.

The slide H1 is given a reciprocating motion by means of a cam H4 mounted on the cam shaft O and engaging a cam follower H5 carried on a dependent arm H6 which forms part of the slide H1. A spring H7 reacting between the slide H1 and the frame F holds the cam follower H5 against the cam H4.

The gripper arms H3 are operated in timed relation to the movement of the slide so as to grip the web against the mandrel before the slide starts to move forward along the table, and to release the web after the end of the forward movement so that the web is free during the return movement of the slide. The gripper arms H3 are mounted on stub shafts H8 connected by gears H9. Arms H10 depending from the stub shafts H8 are urged apart by springs H11 so as to urge the grippers towards the mandrel. One of the depending arms H10 carries a cam follower H12 which is engaged by a cam H13 which controls the opening and closing of the gripper arms. This cam H13 is mounted on a shaft H14 driven from the main shaft O by means of a cross shaft H15 and gearing H16.

The pre-forming dies B10, B11, B12 are operated by mechanism best shown in Figs. 11 and 12.

The side dies B12 are operated by a cam B21 on the main shaft O. The mechanism for operating them is similar to that for operating the gripper arms of the foil mover which has been described. The side dies B12 are mounted on a pair of arms B22 journalled on fixed shafts F4 and connected by gears B24. Depending ends of the arms B22 are urged apart by a spring B25 and one of them carries a cam follower B26 engaging the cam B21.

The mandrel B10 is given an up and down movement. Its upper end is secured to a cross arm B30 which is mounted on the upper end of a vertically sliding shaft B31. This shaft is operated by the cam B32 on the main shaft through a follower B33 carried by the shaft B31 and urged against the cam B32 by a spring B34.

The bottom die B11 is also mounted for vertical movement. It is carried by a bracket B35 on a sliding shaft B36 operated by the cam B37 through a cam follower B38 which is pressed against the cam by a spring B39.

Suction means may be provided for drawing apart the sides of the pocket produced in the foil by the forming dies in order to facilitate withdrawing of the mandrel B10. The suction is applied to the foil by the side dies B12 as they move apart. Suction holes B40 in the faces B19 of the side dies B12 are connected to the suction tubes B41 which connect with a suction pump B42 through a valve B43 which is opened as the side dies B12 move apart by a cam B44 on the main shaft. The suction means are not always necessary, as the sides of the pocket are in effect hinged to the bottom of the pocket so that they may be swung apart by merely withdrawing the mandrel.

The mechanism for operating the side sealing dies C and for filling a pocket in the foil during the side sealing is best shown in Figs. 10 and 11. The side sealing dies C are operated by a cam C3 on the main shaft O by mechanism similar to that which operates the side forming dies B12. This mechanism includes two arms C4 journalled on the shafts F4 and connected by gears C6. The depending end of one of the arms carries a cam follower C7 engaging the cam C3.

Melted wax is introduced into the pocket through a filler nozzle G connected by a tube G3 to the tank G1 through the measuring pump G2 which is operated by cams G4 on the main shaft O. The filler nozzle G is given an up and down movement so that it may be moved down into a pocket in the foil during the filling operation to insure filling the lower part of the pocket. For this purpose, the filler nozzle is mounted on a vertically sliding shaft G5 carrying a cam follower G6 engaging a cam G7 on the main shaft O and held against this cam by a spring G8.

The top sealing dies D are operated by a cam D3. Like the side sealing dies, they are mounted on arms D4 one of which carries a follower D5 engaging the cam D3.

Shears J are provided at the end of the table to cut off from the web a completed wrapped suppository. The shear blades J1 are mounted on arms J2 connected by gears J3 and are operated by a cam J4 on the main shaft which engages a cam follower J5 of one of the arms J2. A spring J6 is provided to keep the shear blades J1 in contact with each other. The blades J1 of the shears J may be inclined outwardly from vertical for a purpose which will be explained in connection with a description of the operation of the machine.

To provide the notches A12 in one side of the flange of the wrapped suppository (see Figs. 17 and 18), a notcher N is provided at the front end of the table, as best shown in Figs. 13 and 14. The notcher has a blade N1 carried by a cross arm N2 on a vertically sliding shaft N3 carrying a cam follower N4 engaging a cam N5 on the main shaft O and held against it by a spring N6. The web of foil A from the pulley F3 is guided to the notcher blade under a plate N7 and over an adjustable bed N8.

The operation of the machine which has been described may readily be understood from the timing diagram Fig. 16 taken in connection with Figs. 6 and 7 which show the effect on the web of foil of the various parts of the machine. The timing diagram Fig. 16 shows the operations which occur during each complete revolution of the main cam shaft O:

The foil feeder H reciprocates once during each revolution of the cam shaft. It remains stationary for considerable periods between its forward and backward movements. Its jaws H3 are closed during its forward movement and open during its rearward movement. The closing and opening of the jaws both occur while the feeder H is stationary so that there can be no slippage of the foil in the feeder during the forward movement of the feeder.

The forming mechanism B operates while the web is free and stationary. The bottom die B11 is brought up and the mandrel B10 brought down to grip the web and, while the web is held between them, the side forming dies B12 are closed to draw the foil about the mandrel. The effect of this is to form an open pocket in the web as shown at 100 in Figs. 6 and 7. The side dies B12 then open and, after they have opened, the mandrel B10 is withdrawn upwardly from the pocket. This withdrawal may be facilitated by applying suction to the openings B40 in the side dies B12 while these dies are separating, to cause them to draw the sides of the folded web apart, but this is not essential. Whether or not suction is used, the sides of the folded web are swung apart after withdrawal of the mandrel B10 as shown at 101 in Figs. 6 and 7.

While a pocket is being formed at the point 100 (Figs. 6 and 7), the pocket which was formed on the next but one previous complete revolution of the cam shaft is being filled at the point 102. To accomplish this, the nozzle G is first lowered and inserted in the pocket, while the sides of the trough of foil are separated as shown at 101. The side sealing dies C then close against the side flanges of the pocket. The pump then discharges liquid through the nozzle G as the nozzle is being moved upwardly in the pocket so that the end of the nozzle does not dip in the liquid in the pocket. After the nozzle G has been withdrawn upwardly from the pocket, the side sealing dies C are opened.

While a pocket is being sealed at its sides and filled at 102, the pocket filled on the previous revolution of the cam shaft is located at the point 103 between the top sealing dies D. Before the top sealing dies D are closed, the shears are operated to cut off the pocket preceding the pocket which is located at the point 103 between the top sealing dies D. After the shears have operated, the top sealing dies are closed to close and seal the top of the pocket at the point 103. This has the effect of lengthening the upper edge of the folded web as shown at 103 in Figs. 6 and 7. This spreading does not affect the operation of the shears, since it takes place after the preceding pocket has been sheared off.

It is not necessary to place the shears immediately adjacent to the top sealing dies D; but, if they are located further from the top sealing dies D, they must be inclined to the vertical, since the lengthening of the upper edge of the folded web by the top sealing dies will cause the folded web to leave the position 103 on a downward arc, in a case where the severing of the web is not done until after the top sealing.

What I claim is:

1. The method of making a wrapped molded article having a tapered end which comprises folding a sheet of metal foil into the form of a U-shaped trough, flattening a portion of the bottom of the trough, forming the sides of the trough into the side and end walls of an open pocket extending upwardly from said flat portion of the bottom, clamping and sealing together the sides of the folded sheet along the side edges of the pocket, introducing melted wax into the pocket through its open top, releasing the folded sheet at the side edges of the pocket and, before the wax has hardened, pressing and sealing together the sides of the folded sheet across the top of the pocket.

2. The method of making a wrapped molded article having a tapered end which comprises folding a sheet of metal foil in the form of a U-shaped trough, flattening a portion of the bottom of the trough, forming the sides of the trough into the side and end walls of an open pocket extending upwardly from said flat portion of the bottom, clamping and sealing together the sides of the folded sheet along the side edges of the pocket and simultaneously introducing melted wax into the pocket through its open top, releasing the folded sheet at the side edges of the pocket and, before the wax has hardened, pressing and sealing together the sides of the folded sheet across the top of the pocket.

3. The method of making a wrapped molded article which comprises folding a sheet of metal foil into the form of a U-shaped trough, forming at an intermediate portion of the bottom of the trough a flat surface with downwardly-inclined pointed ends and a fold line extending outwardly from the apices of said ends, forming the sides of the trough into side walls extending upwardly from the side margins of said flat portion and end walls extending upwardly from the margins of said pointed portions and double flanges extending outwardly from the end walls, to provide a pocket whose top may be opened and closed without deforming its bottom.

4. The method of making a wrapped molded article comprising folding a strip of sheet material into the form of a U-shaped trough, dieforming a flat-bottomed pocket in the trough, sealing the side edges of the pocket and at the same time introducing melted moldable material into the pocket, closing the pocket, and sealing its top before the molded material has hardened.

5. The method of packaging which comprises folding a sheet into the form of a U-shaped trough, inserting an outwardly-tapering flat-bottomed mandrel into the trough and pressing the folded sheet against it to form a pocket with a flat bottom and tapering ends, withdrawing the mandrel from the folded sheet, pressing together the sides of the folded sheet to restore the pocket to the form in which it was formed, and thereafter filling and sealing the pocket.

6. The method of wrapping which comprises folding a strip of sheet material into the form of a U-shaped trough, flattening a portion of the bottom of the trough, forming the sides of the trough extending from flattened portion into the side and end walls of an open pocket extending upwardly from said flat portion of the bottom, clamping and sealing together the sides of the folded sheet along the side edges of the pocket, introducing fluid material into the pocket through its open top, releasing the folded sheet at the side edges of the pocket, and pressing and sealing together the sides of the folded sheet across the top of the pocket.

7. The method of wrapping which comprises folding a strip of sheet material into the form of a U-shaped trough, flattening a portion of the bottom of the trough, forming the sides of the trough extending from said flattened portion into the side and end alls of an open pocket extending upwardly from said flat portion of the bottom, and clamping and sealing together the sides of the folded sheet along the side edges of the pocket.

8. The method of wrapping which comprises folding a sheet into the form of a U-shaped trough, flattening a portion of the bottom of the trough, forming the sides of the trough into the sides and end walls of an open pocket extending upwardly from said flat portion of the bottom, clamping and sealing together the sides of the folded sheet along the side edges of the pocket and simultaneously introducing fluid material into the pocket through its open top, releasing the folded sheet at the side edges of the pocket, and pressing and sealing together the sides of the folded sheet across the top of the pocket.

9. The method of making a wrapper which comprises folding a sheet into the form of a U-shaped trough, forming at an intermediate portion of the bottom of the trough a flat surface with inclined pointed ends and a fold line extending outwardly from the apices of said ends, forming the sides of the trough into side walls extending upwardly from the side margins of said flat portion and end walls extending upwardly from the margins of said pointed portions and double flanges extending outwardly from the end walls, to provide a pocket whose top may be opened and closed without deforming its bottom.

10. A packaging machine comprising feeding means for intermittently gripping and advancing a folded web of sheet material; means for die-forming a pocket in the folded web, means for simultaneously sealing the side edges of the pocket and means for closing and sealing the top of the pocket, located at different stations along the path of the web; means for dispensing a measured quantity of fluid material located at the side-sealing station; and operating means timed to move the die-forming means into pocket-forming position when the gripping means is released and to operate the side sealing means and dispensing means simultaneously.

11. Apparatus for forming a pocket in a web of sheet material comprising means for folding the web into the form of a U-shaped trough, a mandrel, a bottom die and two side dies, means for closing the mandrel and the bottom die against a portion of the bottom of the trough, and means operative thereafter to close the side dies against opposite sides of the trough to draw the sheet material around the mandrel.

12. Apparatus as claimed in claim 11 in which the mandrel and bottom die have opposed flat surfaces.

13. Apparatus as claimed in claim 11 in which the mandrel and bottom die have opposed flat surfaces and one of them has pointed end portions inclined to its flat surface.

14. Apparatus as claimed in claim 11 in which the mandrel has a flat bottom and the bottom die has a top having a flat central portion and downwardly-inclined pointed end portions.

15. Apparatus as claimed in claim 11 in which the mandrel has a flat bottom, substantially parallel sides, and edges tapered inwardly towards its top.

16. Apparatus as claimed in claim 11 in which the side dies have opposed flat marginal portions and, between these portions, recesses for embracing the mandrel.

17. Apparatus for forming pockets in a web of material, comprising a mandrel, side dies having opposed flat marginal portions and recesses for embracing the mandrel, heater sealing dies having opposed faces corresponding to the opposed faces of the side dies, means for causing the mandrel to enter a trough of sheet material, means operable thereafter for closing the side dies about the mandrel to form a pocket in the sheet material, means thereafter separating the sides of the trough, and means for closing the heated dies against the portions of the trough which were engaged by the side dies to close the trough and seal the edges of the pocket.

18. Apparatus for forming a pocket in a web of sheet material comprising means for folding the web into the form of a U-shaped trough, a mandrel, a bottom die and two side dies, means for causing downward movement of the mandrel and upward movement of the bottom die to press a portion of the bottom of the trough between them, and means operative thereafter to close the side dies against opposite sides of the trough to draw the sheet material around the mandrel and bottom die, means operable to separate the side dies and means operable thereafter to raise the mandrel, and means for sucking the sides of the trough against the side dies during their opening movement so that the sides of the trough are separated to permit withdrawal of the mandrel.

References Cited in the file of this patent

UNITED STATES PATENTS

| Number | Name | Date |
| --- | --- | --- |
| 1,944,147 | Aldrich | Jan. 23, 1934 |
| 1,945,255 | Camagni | Jan. 30, 1934 |
| 2,128,964 | Pityo | Sept. 6, 1938 |
| 2,213,602 | Yates | Sept. 3, 1940 |
| 2,214,997 | Guyer | Sept. 17, 1940 |
| 2,269,533 | Howard | Jan. 13, 1942 |
| 2,272,251 | Robinson | Feb. 10, 1942 |
| 2,274,344 | Palmer | Feb. 24, 1942 |
| 2,307,076 | Ray | Jan. 5, 1943 |
| 2,318,508 | Martindell | May 4, 1943 |
| 2,378,324 | Ray et al. | June 12, 1945 |
| 2,508,962 | Moore | May 23, 1950 |